(12) United States Patent
Bailly

(10) Patent No.: US 6,212,082 B1
(45) Date of Patent: Apr. 3, 2001

(54) DEVICE OF ADJUSTMENT OF THE CHARGE CURRENT OF A STORAGE CAPACITOR

(75) Inventor: Alain Bailly, Simiane Collongue (FR)

(73) Assignee: SGS-Thomson Microelectronics S.A., Gentilly (FR)

( * ) Notice: Subject to any disclaimer, the term of this patent is extended or adjusted under 35 U.S.C. 154(b) by 0 days.

(21) Appl. No.: 09/098,857

(22) Filed: Jun. 17, 1998

(30) Foreign Application Priority Data

Jun. 24, 1997 (FR) .................................... 97 08165

(51) Int. Cl.[7] .............................. H02M 7/04; H02M 5/42; H02M 3/18
(52) U.S. Cl. ................................ 363/89; 363/97; 363/61
(58) Field of Search .................................. 363/89, 16, 65, 363/20, 21, 97, 61; 323/282, 285, 286, 222, 224

(56) References Cited

U.S. PATENT DOCUMENTS

| | | | |
|---|---|---|---|
| 4,459,539 | * | 7/1984 | Cordy, Jr. .............................. 323/299 |
| 4,481,462 | * | 11/1984 | De Kleijn ............................. 323/274 |
| 4,792,887 | * | 12/1988 | Bernitz et al. ........................ 363/89 |
| 5,134,355 | * | 7/1992 | Hasting ................................ 323/211 |
| 5,654,628 | * | 8/1997 | Feldtkeller ........................... 323/282 |
| 5,781,427 | * | 7/1998 | Moreau ................................ 363/61 |
| 5,828,562 | * | 10/1998 | Rivet .................................... 363/125 |
| 5,844,792 | * | 12/1998 | Moreau ................................ 363/89 |

FOREIGN PATENT DOCUMENTS 2 742 010   6/1997 (FR) .............................. H02M/7/04

OTHER PUBLICATIONS

French Search Report for French Application No. 0708165, filed Jun. 24, 1997.
Patent Abstracts from Japan vol. 007, No. 32 (E–180), Jun. 9, 1983 & JP 58 04686803/18/83.
Patent Abstracts from Japan vol. 018, No. 570 (E1623), Oct. 31, 1994 & JP 06 209574.

* cited by examiner

Primary Examiner—Peter S. Wong
Assistant Examiner—Rajnikant B. Patel
(74) Attorney, Agent, or Firm—Wolf, Greenfield & Sacks, P.C.; James H. Morris; Theodore E. Galanthay

(57) ABSTRACT

The present invention relates to a supply circuit with a storage capacitor and a method of control of this circuit including, across a rectifying bridge, a storage capacitor associated with a charge path and with a discharge path, in which the duration of charge periods of the storage capacitor is set, at least at steady state, to a predetermined duration.

9 Claims, 4 Drawing Sheets

DEVICE OF ADJUSTMENT OF THE CHARGE CURRENT OF A STORAGE CAPACITOR

BACKGROUND OF THE INVENTION

1. Field of the Invention

The present invention relates to supply circuits of the type including a rectifier and a storage capacitor, for supplying a load via a regulation circuit such as a switched-mode circuit.

2. Discussion of the Related Art

At the present time, many devices electrically supplied from the mains include a switched-mode power supply. The power is extracted from the network in the form of current peaks of short duration. These current peaks disturb the network efficiency. The effects of these current peaks worsen with the number of devices connected to the network and incorporating a switched-mode power supply. Accordingly, electric distribution companies have imposed several standards to improve the power factor of power supplies.

FIG. 1 shows a conventional diagram of provision of a d.c. power supply from the mains. Terminals X and Y of the a.c. supply are connected to input terminals of a rectifying bridge 1, output terminals A and B of which are connected to a storage capacitor C1 and to a load L. It will be assumed that load L incorporates a regulation circuit, for example, a switched-mode power supply, connected to a load. Further, a resistor r of low value for limiting the current surges of the system upon power-on is often to be found in series with capacitor C1.

FIG. 2A shows, as a function of time, rectified mains voltage $V_{XY}$ and voltage $V_AB$, between terminals A and B (neglecting the effect of resistor r). It is assumed that at a time t0, the voltage across capacitor C1 is higher than the mains voltage. Then, the voltage between terminals A and B corresponds to the voltage across capacitor C1 which progressively discharges into load L. From a time t1, the rectified mains voltage becomes higher than the voltage across the capacitor, and the mains ensures the supply of load L and the recharge of capacitor C1. From a time t2, the voltage on the capacitor becomes higher than the mains voltage and, again, the capacitor supplies the load. This is repeated at the next halfwave (times t3 and t4).

FIG. 2B shows the shape of the current extracted from the mains between times t1–t2 and t3–t4. Theoretically, the current has a substantially triangular shape. In practice and as illustrated in FIG. 2B, the current is substantially sinusoidal due to the mains impedances and, more specifically, it corresponds to a sine wave peak, that is, its shape is substantially parabolic. The current peaks are symmetrical with respect to their maximum and this maximum can be relatively high.

SUMMARY OF THE INVENTION

An object of the present invention is to provide a load supply circuit which limits the amplitude and increases the angle of the current peaks extracted from the mains.

Another object of the present invention is to provide such a supply circuit in which the current peaks extracted from the mains are asymmetrical. The present invention also aims at enabling these current peaks, in case of need, to exhibit a maximum at the beginning of each peak.

The present invention also aims at providing a supply circuit in which the charge current of the storage capacitor is controllable independently from the type of load supplied.

To achieve these and other objects, the present invention provides a supply circuit with a storage capacitor including, across a rectifying bridge, a storage capacitor associated with a charge path and with a discharge path, the charge path including a controllable current source and the circuit including means of control of the current source so that, at least in steady state, the charge periods of the storage capacitor have a predetermined duration.

According to an embodiment of the present invention, the circuit includes a means of detection of the charge and discharge periods of the storage capacitor, and a comparator assembly controlling the value of the current provided by the source, to control the charge periods of the capacitor with a reference value.

According to an embodiment of the present invention, the comparator compares the mean value of a detection signal having two states, indicative of the charge and discharge periods of the storage capacitor, with a predetermined reference voltage.

According to an embodiment of the present invention, the comparator is formed by an operational amplifier, connected as an integrator of the detection signal provided by a bipolar transistor controlled by the voltage across the current source.

According to an embodiment of the present invention, the base of the bipolar transistor is connected, via a resistor, to a first output terminal of the current source, the detection signal being taken from the collector of the bipolar transistor, the emitter of which is connected to a second terminal of the current source.

According to an embodiment of the present invention, the current source is an N-channel MOS transistor.

According to an embodiment of the present invention, the intrinsic diode of the MOS transistor forms the discharge path for the storage capacitor.

The present invention also provides a method of control of a supply circuit with a storage capacitor including, across a rectifying bridge, a storage capacitor associated with a charge path and with a discharge path, this method including setting, at least at steady state, the duration of charge periods of the storage capacitor to a predetermined duration.

According to an embodiment of the present invention, the method includes controlling the value of a charge current of the storage capacitor to maintain, at each halfwave and at least at steady state, the charge duration of the storage capacitor to the predetermined value.

According to an embodiment of the present invention, the predetermined duration is at minimum 2.17 ms, preferably 2.67 ms, for an a.c. supply frequency of the rectifying bridge of 50 hertz.

According to an embodiment of the present invention, the predetermined duration is at minimum 1.81 ms, preferably 2.23 ms, for an a.c. supply frequency of the rectifying bridge of 60 hertz.

The foregoing objects, features and advantages of the present invention will be discussed in detail in the following non-limiting description of specific embodiments in connection with the accompanying drawings.

DETAILED DESCRIPTION

Figure 1:
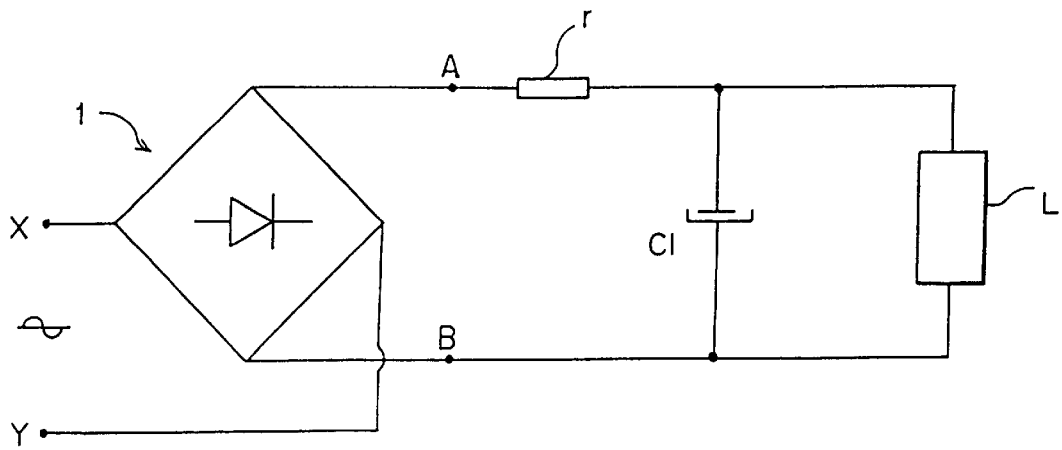
FIGS. 1 and 2, previously described, are meant to show the state of the art and the problem to solve.

The same elements have been referred to with the same reference numbers in the different drawings. For clarity, only those elements necessary to the understanding of the present invention have been shown in the drawings and the voltage and current curves are not to scale.

A characteristic of the present invention is to organize, at each halfwave of the sine supply voltage, the charge of the storage capacitor during a predetermined duration. According to the present invention, a charge path of the storage capacitor is associated with a controllable current source, the value of the charge current being, at least in steady state, automatically adjusted so that the charge time is maintained constant.

Figure 3:
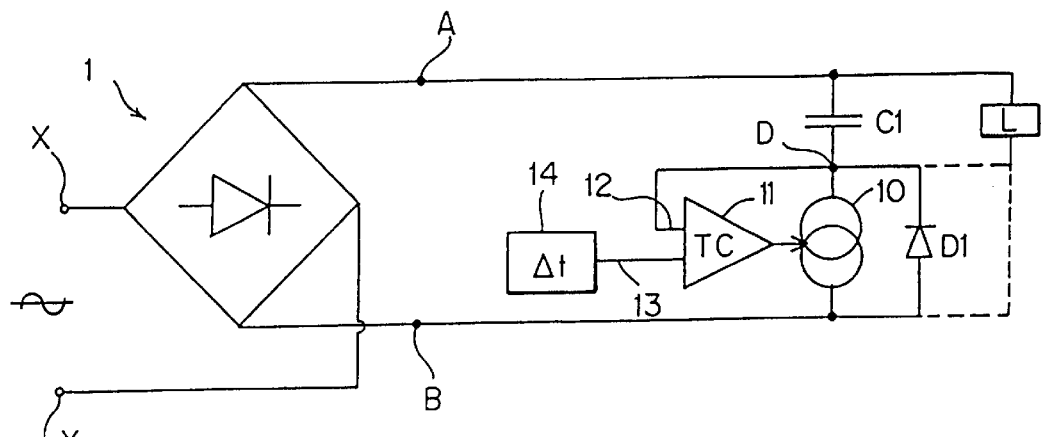
FIG. 3 schematically shows an embodiment of a supply circuit of a storage capacitor according to the present invention.

FIG. 3 schematically shows an embodiment of a storage capacitor supply circuit according to the present invention.

The circuit includes a rectifying bridge 1 provided with input terminals X and Y and with rectified output terminals A and B, a storage capacitor C1 and a load L. Capacitor C1 is associated with a discharge path defined by a diode D1 and with a charge path defined by a controllable current source 10.

According to the present invention, load L is connected, either across capacitor C1, or to output terminals A, B of rectifying bridge 1. The choice between the two connection modes of load L depends on the application and on the desired characteristics for the power supply. For example, a connection of the load across capacitor C1 has a specific advantage in the case where load L is formed of a switched-mode power supply, such a connection having the advantage of avoiding the use of an additional filtering capacitor at the output of the rectifying bridge. Indeed, the filtering of high frequency interferences linked to the switched-mode power supply is, in this case, directly performed by storage capacitor C1. A connection of load L to terminals A, B, has the advantage of generating less power dissipation in the capacitor charge circuit.

Current source 10 is, according to the present invention, formed of an active element limiting the current in the charge path of capacitor C1 to a controllable value. Source 10 is controlled by a comparator 11 (TC) which defines the duration of each charge period of capacitor C1.

Since the charge periods have a determined duration, the charge current peaks may now be widened to a given value. For this purpose, comparator 11 modifies the value of the current of source 10 so that the duration of the charge periods correspond, at least in steady state, to the determined duration.

According to the present invention, advantage is taken from the fact that the frequency of the a.c. supply voltage is set very precisely (for example, to a given value of 50 hertz or 60 hertz). Thus, the duration of the charge periods can be induced from the mean value of a two-state signal of detection of the (charge or discharge) period in which the capacitor finds itself. This mean value can then be compared with a predetermined reference. Indeed, the ratio between the reference voltage and the high state level of the detection signal is proportional to the ratio of a reference duration and the duration given by the mean value of the detection signal. If the high state of the detection signal corresponds to charge periods, the reference voltage divided by the high state level of the detection signal is proportional to the desired duration. If the high state of the detection signal corresponds to discharge periods, the complement to 1 of the reference voltage divided by the high state level of the detection signal is proportional to the desired duration.

Thus, according to a preferred embodiment, a first input 12 of comparator 11 receives the mean value of a voltage signal with two states indicative of the (charge or discharge) period of capacitor C1, and a second input 13 of comparator 11 receives, from a block 14, a voltage representing a predetermined time reference (Δt) of conduction of source 10. The adjustment of the value of the charge current by comparator 11 is performed, preferably and as will be seen hereafter in relation with FIGS. 5 and 6, based a detection of the voltage across current source 10.

According to one embodiment of the present invention, for an a.c. supply frequency of 50 hertz, the duration of the charge periods of capacitor C1 is set to at least 2.17 ms. Preferably, this duration is set to a value of approximately 2.67 ms.

According to another embodiment of the present invention, for an a.c. supply frequency of 60 hertz, the duration of the charge periods of capacitor C1 is set to at least 1.81 ms. Preferably, this duration is set to a value of approximately 2.23 ms.

Preferably, the value of the current provided by source 10 is modified slowly enough with respect to the period of the a.c. supply, so that the charge current of the capacitor is, at least in steady state, substantially constant during a charge period.

Figure 2A:
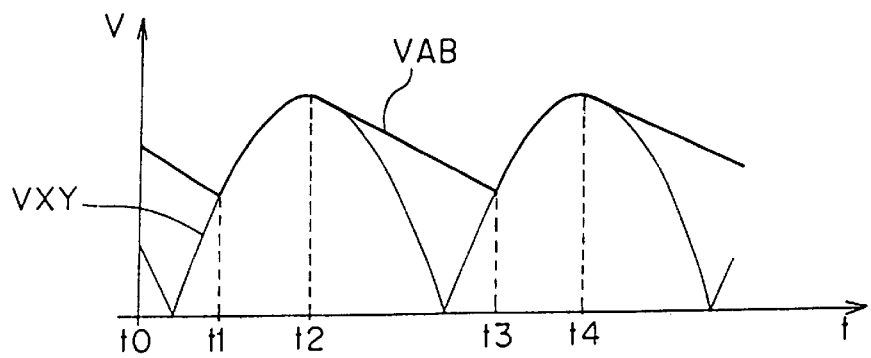
Figure 2B:
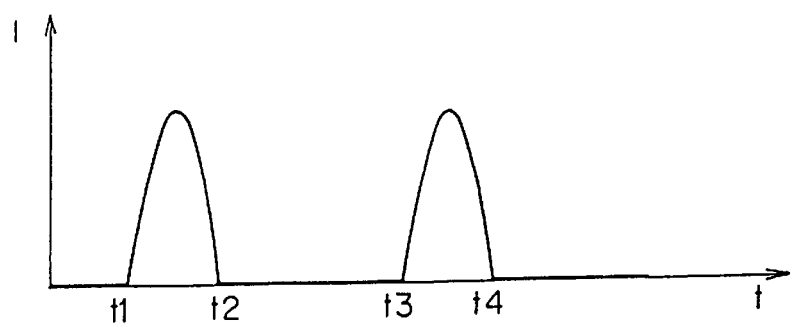
Figure 4A:
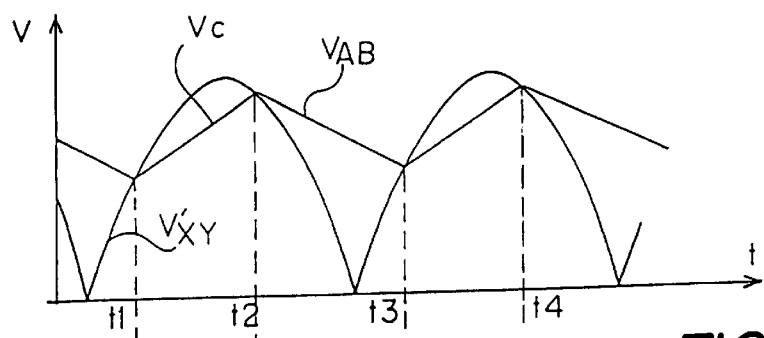
FIGS. 4A, 4B, 4C, and 4D illustrate, in the form of timing diagrams, the operation of the circuit shown in FIG. 3.

Thus, in conditions similar to those of FIG. 2, a substantially identical shape of voltage $V_{AB}$ is obtained. However, as is shown in FIG. 4A, since capacitor C1 is charged at a substantially constant current by source 10, voltage $V_C$ thereacross varies substantially linearly. The capacitor stops charging to take over the supply voltage at time t2 when voltage $V_{AB}$ becomes lower than $V_C$. According to the present invention, the control of current source 10 guarantees that time t2 occurs, at soonest, at the end of duration Δt after time t1 of beginning of the charge of capacitor C1.

During periods when current is provided by capacitor C1 (discharge periods), voltage $V_{AB}$ across current source 10 is negative and corresponds to the voltage drop in forward-biased diode D1. When voltage $V_{AB}$ becomes higher than voltage $V_C$ (times t1, t3), voltage $V_{AB}$ becomes positive and time t1 (t3) can thus be detected. When voltage $V_{AB}$ becomes lower than voltage $V_C$, voltage $V_{DB}$ becomes negative again and time t2 (t4) is detected. These detections enable control of the value of the current provided by source 10 to maintain duration Δt constant.

Figure 4B:
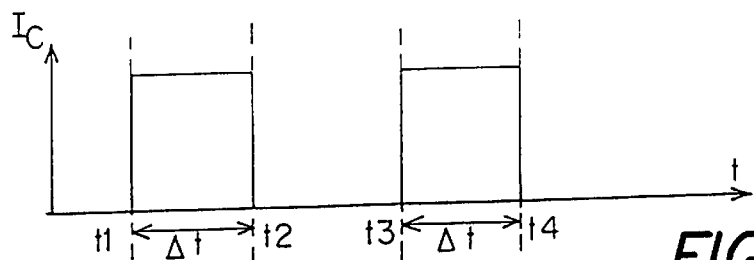

FIG. 4B shows current $I_C$ in capacitor C1 during charge periods. This current is substantially constant due to the high time constant of the control signal of source 10.

Figure 4C:
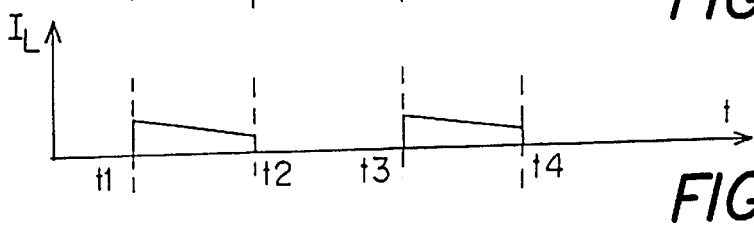

FIG. 4C shows current $I_L$ in the load during periods t1–t2 and t3–t4. This current is provided by the rectified mains voltage. Given that the case of a regulated power supply has been considered, the power in the load is constant. Since, during periods t1–t2 and t3–t4, voltage $V_{AB}$ is increasing, the current in the load will be decreasing. Of course, a current also flows in the load outside periods t1–t2 and t3–t4. This current provided by the discharge of capacitor C1 has not been shown since it is here only desired to explain the shape of the current issued by the mains which is zero outside periods t1–t2 and t3–t4.

Figure 4D:
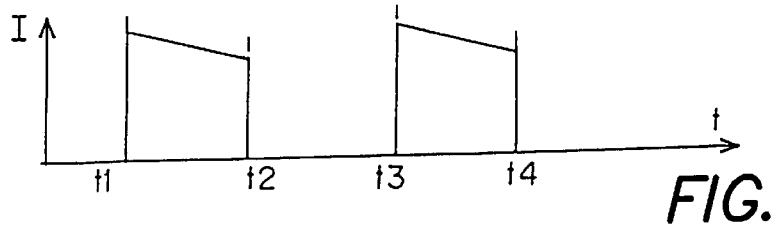

FIG. 4D illustrates the total current extracted from the rectified power supply during periods t1–t2 and t3–t4. This current I is the superposition of currents $I_L$ and $I_C$. Assuming that the charge current of the capacitor is sufficiently constant for current variations in the load to be predominant with respect to variations of the charge current of capacitor C1, each current peak exhibits a maximum at time t1 and decreases until time t2.

Although it has been here assumed that the load power is constant, if this power varies, the charge periods of capacitor C1 will however keep a fixed duration Δt, and comparator 11 will adjust the value of the charge current issued by source 10 to maintain this duration constant. The same occurs in case of a variation of the supply voltage.

Figure 5:
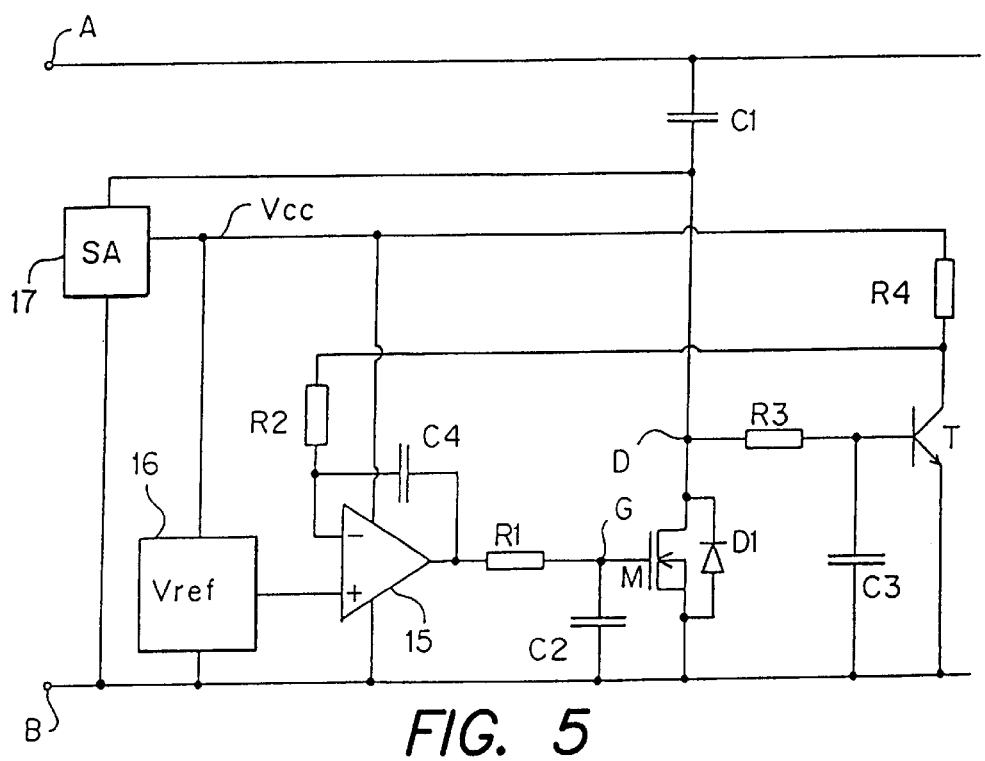
FIG. 5 shows an embodiment of a time comparator of the circuit shown in FIG. 3.

FIG. 5 shows in more detail an embodiment of the supply circuit shown in FIG. 3. In FIG. 5, rectifying bridge 1 and load L have not been shown.

According to this embodiment, the controllable current source (10, FIG. 3) is formed by a MOS transistor M, here with an N channel, connected in series with capacitor C1 between terminals A and B. The drain (D) of transistor M is the midpoint of the series connection of capacitor C1 and of MOS transistor M. Diode D1 of the discharge path of capacitor C1 here is the intrinsic diode of MOS transistor M.

Transistor M is controlled, for example, by an operational amplifier 15, an output of which is connected, via an RC cell (R1, C2) to gate G of transistor M. An inverting input of amplifier 15 is connected, via a resistor R2 of high value, to the collector of an NPN-type bipolar transistor T. The emitter of transistor T is connected to terminal B and its base is connected, via a resistor R3, to the drain of the MOS transistor. The base of transistor T is also connected, via a capacitor C3, to terminal B. Transistor T constitutes a means of detection of the charge and discharge periods of capacitor C1. A capacitor C4 connects the inverting input of amplifier 15 to its output to form an integrator assembly, with a high time constant with respect to the period of the a.c. supply. A non-inverting input amplifier 15 receives a reference voltage Vref, provided by a block 16.

A block 17 of stabilized supply (SA) provides a low d.c. voltage Vcc (for example of approximately 10 volts) for supplying block 16 and amplifier 15, and for biasing bipolar transistor T. Stabilized supply block 17 is, preferably, supplied between terminal D and terminal B. Block 16 includes, for example, a resistive dividing bridge (for example, formed of a potentiometer) setting value Vref based on voltage Vcc. A resistor R4 connects the collector of transistor T to voltage Vcc for its biasing.

As an alternative, supply voltage Vcc of the circuit according to the present invention can be extracted from the output of the rectifying bridge by a conventional charge pumping circuit. However, an advantage of taking the supply voltage of block 17 from the drain of transistor M is that this does not require any additional high-voltage capacitor with respect to capacitor C1. This minimizes the system dissipation, thus improving the general efficiency.

The practical implementation of the stabilized power supply is within the abilities of those skilled in the art based on the functional indications given hereabove.

During the discharge periods of capacitor C1, diode D1 is forward biased and transistor T is thus blocked. A small portion of the discharge current flows in the channel of transistor M which is, according to the present invention, permanently on.

During the charge periods of capacitor C1, transistor T is on (saturated) and diode D1 is reverse biased. According to the present invention, transistor M then operates at saturation (that is, it is more or less conductive according to the gate potential).

In steady state, and assuming that the load power remains constant, the mean value of collector voltage VT of transistor T is equal to reference voltage Vref applied on the non-inverting input of amplifier 15. Signal VT has the shape of a square signal of double frequency with respect to the frequency of the a.c. supply. In case of a divergence between the mean value of voltage VT and reference voltage Vref, amplifier 15 modifies the biasing gate voltage of MOS transistor M to recover this balance. Resistor R1 stabilizes the output of amplifier 15 and capacitor C2 controls the gate of transistor M under low impedance to avoid transient current variations, especially at the beginning (time t1) of charge periods of the capacitor.

FIGS. 6A to 6D illustrate the operation of the circuit shown in FIG. 5.

Figure 6A:
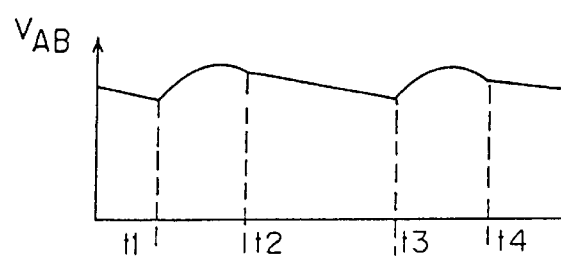
FIGS. 6A, 6B, 6C, and 6D illustrate, in the form of timing diagrams, the operation of the circuit shown in FIG. 5.

FIG. 6A shows the shape of voltage $V_{AB}$ across the load (not shown) in a case similar to that shown in FIG. 4A.

Figure 6B:
Figure 6B:
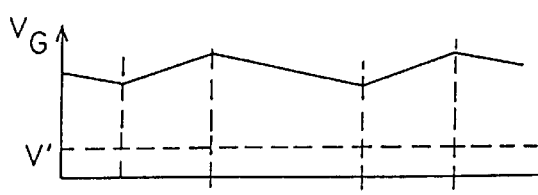

FIG. 6B shows the shape of voltage $V_G$ of the gate of transistor M. Value V' shows the gate-source voltage level of transistor M from which it turns on. Voltage $V_G$ is permanently higher than voltage V' and it will be seen to it that variations of voltage $V_G$ are such that the current in transistor M varies little (for example, not by over 10%) during charge periods.

Figure 6C:
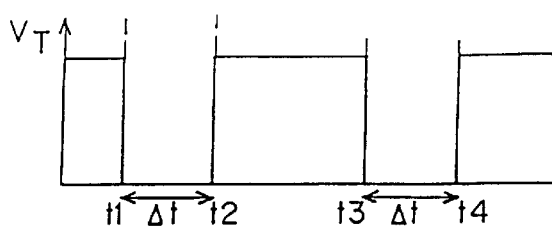
Figure 6D:
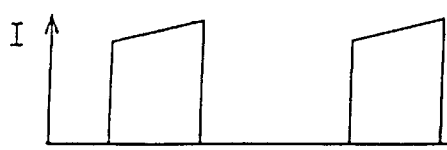

FIG. 6C shows the shape of voltage VT, and FIG. 6D shows the shape of current I extracted from the rectified power supply during charge periods of capacitor C1. Here, the current peaks exhibit a maximum at their end (times t2, t4) since it has been assumed that the influence, upon current I, of the triangular signal issued by the integrator assembly is predominant with respect to the influence of the charge.

It should be noted that duration Δt of the charge periods only depends on the resistive dividing bridge supplying voltage Vref and on the frequency of the a.c. power supply, which are both very stable. No other parameter of the circuit conditions duration Δt, except in the case of parameters outside the circuit operating range, that is, too low a supply voltage, a storage capacitor of too low a value or a too high output power required by load L.

As soon as at least one of these parameters is not respected, for example, during the transient initial charge period of capacitor C1, transistor M is in linear state, that is, it provides a maximum current, until the steady state is reached.

An advantage of the present invention is that the supply circuit does not require any control signal from the load. Thus, the circuit is independent from the type of supplied load and may be interposed in a conventional circuit between a rectifying bridge and a load, for example, a switched-mode power supply, without it being necessary to bring any modification to the conventional load to take a control signal therefrom.

Another advantage of the present invention is that by setting the duration of the charge periods of capacitor C1, a widening of the current peaks taken from the power supply during the capacitor charge is guaranteed. Further, these current peaks (FIGS. 4D and 6D) are asymmetrical.

As a specific example of embodiment, for an a.c. supply at a 50-hertz frequency, the following values may be adopted for the various components:

C2, C3=10 nF;
C4=100 nF;
R1, R4=10 kohms;
R2=1 Mohms; and
R3=47 kohms.

With a voltage Vcc on the order of 10 volts, value Vref set, for example, by a potentiometer, is equal to 7.33 volts. Thus, the on-state periods of transistor M are controlled so that the mean value of signal $V_T$ is equal to 7.33 volts, which leads, for a period of 10 ms of signal $V_T$, to charge periods ($\Delta t$) of transistor C1 of 2.67 ms.

Figure 7:
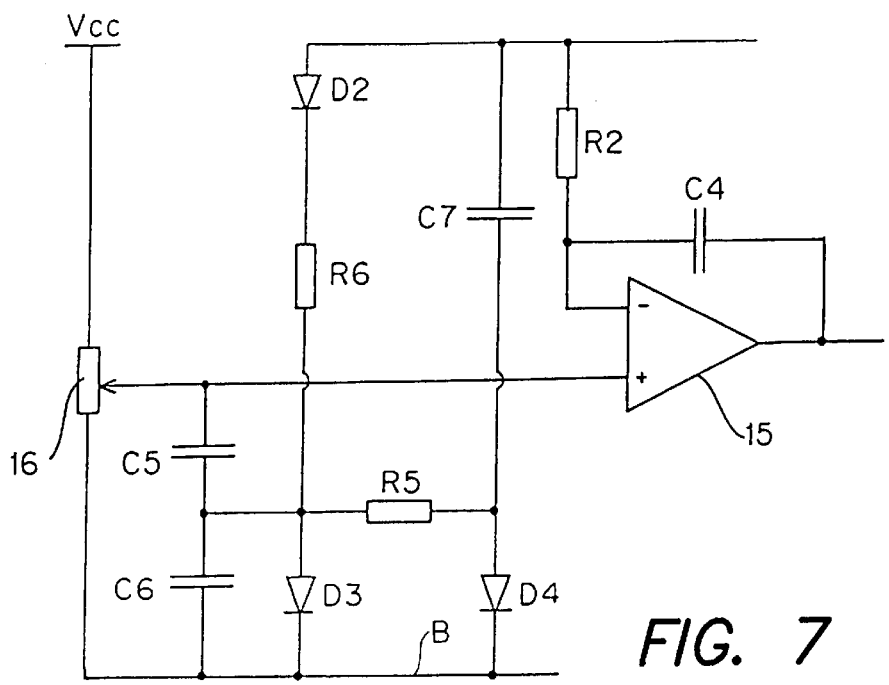
FIG. 7 partially shows an alternative of the supply circuit according to the present invention.

FIG. 7 shows an alternative of the supply circuit according to the present invention, provided with additional means for forcing the initial value of the gate potential of the MOS transistor at each halfwave, and for forcing the charge current of capacitor C1 to be maximum at the beginning of each charge period, to guarantee that the asymmetrical peaks of current I extracted from the rectified power supply exhibit a maximum at their beginning. In FIG. 7, only the integrator assembly (15, R2, is C4, 16) and these additional means have been shown.

A capacitor C5 (for example, a chemical capacitor), a first terminal of which is connected to the non-inverting input of amplifier 15 and a second terminal of which is connected, via a capacitor C6, to terminal B, introduces, at the starting of the circuit, a time constant upon appearance of voltage reference Vref set by a potentiometer 16. This slows down the charging of capacitor C1 (not shown in FIG. 7) to avoid damaging MOS transistor M upon power-on. A temperature detector can also be used to protect transistor M against a breakdown, especially in the case of an implementation in the form of a monolithic integrated circuit.

The midpoint of the series connection of capacitors C5 and C6 is connected, via a resistor R5, to a first terminal of a capacitor C7, a second terminal of which is connected to the collector of the bipolar transistor (not shown in FIG. 7). A diode D2, connected in series with a resistor R6, connects the second terminal of capacitor C7 to the midpoint of the series connection of capacitors C5 and C6. Two diodes D3, D4 connect the two terminals of resistor R5 to terminal B.

Figure 8A:
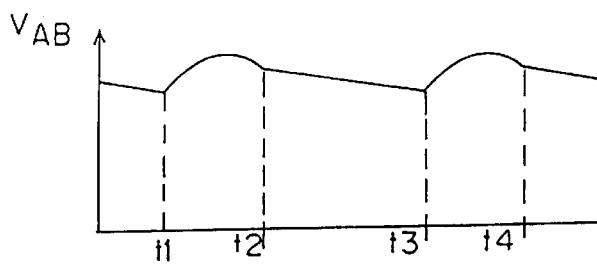
FIGS. 8A, 8B, 8C, and 8D illustrate, in the form of timing diagrams, the operation of the circuit shown in FIG. 7.
Figure 8B:
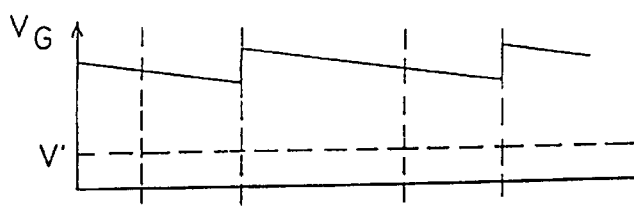
Figure 8C:
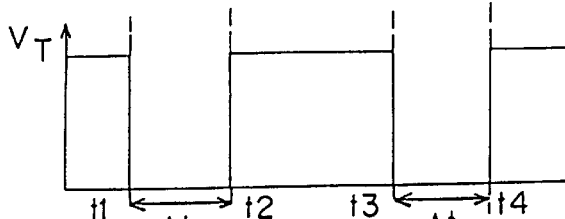
Figure 8D:
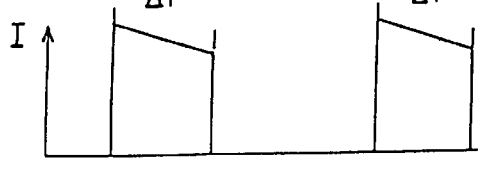

FIGS. 8A to 8D illustrate the operation of a circuit according to the present invention, provided with the additional means of FIG. 7. FIG. 8A show the shape of voltage $V_{AB}$ across the load (not shown) in a case similar to that shown in FIG. 4A. FIG. 8B shows the shape of voltage $V_G$ of the gate of transistor M. FIG. 8C shows the shape of voltage $V_T$, and FIG. 8D shows the shape of current I extracted from the rectified power supply during charge periods of capacitor C1.

Capacitor C7 has the function of creating a negative voltage ramp across capacitor C6 during charge periods of capacitor C1, transistor T being on and grounding the second terminal of capacitor C7. When transistor T is off, capacitor C6 is charged again to its quiescent voltage (on the order of 0.6 volts set by diode D3) through resistor R6 and diode D2. The negative voltage ramp is transmitted by capacitor C5 to the non-inverting input of amplifier 15. Since the amplitude of this ramp is higher than that naturally generated by the integrator, the output of amplifier 15 decreases (FIG. 8B) during the charge periods of capacitor C1. Accordingly, the charge current also exhibits a negative current ramp (FIG. 8D) with a current maximum at the beginning of each charge period.

As a specific example of embodiment, the following values may be adopted for the various components:

C5=2.2 $\mu$F;
C6, C7=100 nF;
R5=1 Mohms; and
R6=220 kohms.

Of course, the present invention is likely to have various alterations, modifications, and improvements which will readily occur to those skilled in the art. Especially, the sizing of the different components of the supply circuit according to the present invention may be modified according to the frequency of the a.c. power supply and to the desired charge period duration for the storage capacitor. Further, other means of detection of the charge and discharge periods of the storage capacitor may be used, and MOS transistor M may be replaced with another controllable current limiting component. Further, other means than those indicated in relation with FIG. 7 can be used to force the current peaks to exhibit a maximum at their beginning. For example, a sample-and-hold circuit synchronized to the frequency of the power supply may be interposed between the output of amplifier 15 and resistor R1 (FIG. 5) or a compensating voltage may be introduced on the gate of the MOS transistor.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A supply circuit comprising:
   a rectifying bridge;
   a storage capacitor coupled across the rectifying bridge, the storage capacitor having a charge path and a discharge path, wherein the charge path includes a controllable current source; and
   a circuit coupled to the controllable current source to generate a first signal to be received by the controllable current source, the first signal to cause the controllable current source to charge the storage capacitor for a predetermined duration, wherein the circuit includes a comparator having one input coupled to a reference voltage, another input coupled to the storage capacitor, and an output at which the first signal is generated.

2. The supply circuit of claim 1, wherein the circuit includes means for detecting the charge and discharge periods of the storage capacitor, and a comparator assembly to generate the first signal to control the value of the current issued by the controllable current source, wherein the comparator controls a charge period of the capacitor based on a comparison with a reference value.

3. The supply circuit of claim 2, wherein the comparator compares the mean value of a detection signal having two states, indicative of the charge period and a discharge period of the storage capacitor, with a predetermined reference voltage.

4. The supply circuit of claim 3, wherein the comparator is formed by an operational amplifier, connected as an integrator of the detection signal provided by a bipolar transistor controlled by the voltage across the current source.

5. A supply circuit comprising:
   a rectifying bridge;
   a storage capacitor coupled across the rectifying bridge, the storage capacitor having a charge path and a discharge path, wherein the charge path includes a controllable current source;
   a circuit coupled to the controllable current source to generate a first signal to be received by the controllable current source, the first signal to cause the controllable current source to charge the storage capacitor for a predetermined duration, the circuit including means for detecting the charge and discharge periods of the storage capacitor, and a comparator assembly to generate the first signal to control the value of the current issued by the controllable current source;

wherein the comparator controls a charge period of the capacitor based on a comparison with a reference value, and compares the mean value of a detection signal having two states. indicative of the charge period and a discharge period of the storage capacitor, with a predetermined reference voltage, and wherein further the comparator is formed by an operational amplifier, connected as an integrator of the detection signal provided by a bipolar transistor controlled by the voltage across the current source, and the base of the bipolar transistor is connected, via a resistor, to a first output terminal of the current source, the detection signal being taken from the collector of the bipolar transistor, the emitter of which is connected to a second terminal of the current source.

6. The supply circuit of claim 1, wherein the controllable current source is an N-channel MOS transistor.

7. The supply circuit of claim 6, wherein an intrinsic diode of the MOS transistor forms the discharge path of the storage capacitor.

8. The supply circuit of claim 1, wherein the circuit includes a comparator having one input coupled to a reference voltage, another input coupled to the storage capacitor, and an output at which the first signal is generated.

9. The supply circuit of claim 1, wherein the predetermined duration occurs at least in steady state.

* * * * *